Sept. 12, 1967 HISASHI KANEKO 3,341,658

SYNCHRONIZATION SYSTEM UTILIZING A MATCHED FILTER FOR CORRELATION DETECTION OF SYNC SIGNALS

Filed Feb. 4, 1964 3 Sheets-Sheet 1

Inventor
H. KANEKO
By [signature]
Attorney

Inventor
H. KANEKO
By [signature]
Attorney

Inventor
H. KANEKO
By [signature]
Attorney 3,341,658
SYNCHRONIZATION SYSTEM UTILIZING A MATCHED FILTER FOR CORRELATION DETECTION OF SYNC SIGNALS Hisashi Kaneko, Tokyo, Japan, assignor to Nippon Electric Company, Limited, Tokyo, Japan, a corporation of Japan Filed Feb. 4, 1964, Ser. No. 342,464
Claims priority, application Japan, Mar. 18, 1963, 38/14,640
17 Claims. (Cl. 178—69.5)

This invention relates to a synchronizing signal detector for detecting synchronizing time points at the receiver end of transmission apparatus. The detector may be used in receivers adapted to receive signals that are: pulse-amplitude modulated (PAM), pulse-phase modulated (PPM), pulse-width modulated (PWM), transmitted by television, transmitted waveforms, pulse-code modulated (PCM), digitally coded, etc. In general, the detector of this invention can be utilized for received signals that cannot be demodulated unless the synchronizing time points are given one after another as time origins. Additionally, the detector can be used in various types of digital equipment. Therefore, this invention also relates to a synchonizing signal detector which can be used in synchronizing equipment for maintaining bit synchronism, word synchronism, and frame synchronism in digital transmission.

In the above-mentioned transmission systems, successive synchronizing signals are transmitted through a transmission line along with time divided information signals which carry information other than that concerning the synchronizing time points. The synchronizing and information signals in general have been affected by noise during transmission (i.e., before being received by a receiver). Synchronization at the receiver is used to determine the correct synchronizing time points for the receiver.

Prior art synchronizing detectors utilized signals in a specific form or arrangement, such as large amplitude pulses which differed from the information signals to achieve synchronization. Recently a synchronizing system has been proposed which uses synchronism signals that are to be detected in the statistically optimum manner. Synchronizing equipment has also been proposed wherein the statistically maximum likelihood may be obtained for the synchronizing time points by using a matched filter for detection. For example, in distance measuring equipment such as radar which utilizes a form of time estimation, since the a priori probability of the point at which the target is located is unknown, it has been found that statistically the maximum likelihood can be estimated by detecting the time (and hence determine the distance at which the output of the matched filter reaches a maximum). On the other hand, for detecting a synchronizing signal, it is to be noted that the synchronizing signals generally arrive either periodically or at preliminarily estimable time points. Furthermore, in many cases it is possible to preliminarily estimate the variations in time of arrival of synchronizing signals. In other words, one can estimate the a priori probability $p(T)$ of the synchronizing time points T (i.e., the probability of the event) such that when a synchronizing time point obtained from a preceding synchronizing signal is assumed to be correct, the synchronizing time point detected from the subsequently received synchronizing signal is in fact at a time point T. In the cases where the a priori probability $p(T)$ is known, a synchronizing time point detector is said to be statistically optimum when it performs estimations according to Bayes' law. In other words, the detector detects the synchronizing time point T so as to maximize the a posteriori probability $p_y(T)$ of the synchronizing time point T (or the probability of the event) such that the detected synchronizing time point T is a true synchronizing time point $T_0$.

One conventional synchronizing signal detector which operates on the principle of maximum likelihood estimation, known in the prior art device is described in an article entitled "Group Synchronizing of Binary Digital Systems" by R. H. Barker appearing on pages 273–287, "Communication Theory," compiled by W. Jackson and published by Butterworth Scientific Publications in 1953. In this prior art device, it has been impossible to maintain steady synchronism because in such a synchronizing signal detector, estimations are conducted without any variation in weighing factors; all are weighed equally for all times T even when distribution of the a priori probability $p(T)$ of the synchronizing time point T is fairly sharp with respect to time.

Therefore, an object of the invention is to provide a synchronizing signal detector in which stable synchronism can be maintained and a method for synchronizing such a detector.

Another more particular object of the invention is to provide a synchronizing signal detector for detecting synchronizing time points whose a posteriori probability is maximized when the a priori probability thereof is given.

The synchronizing signal detector according to the invention includes a matched filter which is used for correlation detection and is adapted to produce a correlation output representative of the received signal and a synchronizing signal of a predetermined waveform, along with a variable detector for detecting (and thus predicting) from said correlation output, that point in time at which the a posteriori probability $p_0(T)$ of the synchronizing time point T grows maximum. As will be described in more detail hereinafter, the synchronizing time point T at which the a posteriori probability $p_0(T)$ reaches a maximum is obtained by lowering (relative to the correlation output) the detection level of a monitoring circuit which monitors the magnitude of the correlation output, at a time when the a priori probability $p(T)$ of the preliminarily estimated synchronizing time point T is large so that the time point at which the correlation output reaches a maximum may easily be detected. The synchronizing signal detector of the invention therefore comprises the above-described filter and a variable detector which is supplied with timing signals for determining the time intervals where the a priori probability $p(T)$ of the synchronizing time point T is large. The detection level of said variable detector is lowered at a time when the a priori probability $p(T)$ is large. More particularly, a synchronizing signal detector of the invention comprises, the aforementioned filter; a waveform generator for producing an output waveform $g(T)$ which represents a predetermined function, such as a logarithmic function of the a priori probability $p(T)$ of the synchronizing time point T; a combiner for adding the output waveform and the correlation output to (relatively) enlarge the correlation output at a time when the a priori probability $p(T)$ of the synchronizing time point T is large; and a detector for monitoring the combined output of the combiner with reference to a substantially invariable detection level and for producing an output when the combined output grows beyond the detection level. In other words, the synchronizing signal detector of the invention can be realized by adding a waveform generator and a combiner to a conventional synchronizing signal detector which includes a matched filter or a correlation detector.

A synchronizing signal detector of the invention operates equally well whether the synchronizing and the information signals form a continuous waveform or where said signals are the digital signals which are sampled and provided with discrete amplitudes. In the latter case, a synchronizing signal detector of the invention can be incorporated into a synchronizing device for maintaining the bit, the word, and/or the frame synchronism.

The above-mentioned and other features and objects of the invention and the means of attaining them will become more apparent and the invention itself will be best understood by reference to the following description of embodiments of the invention taken in conjunction with the accompanying drawings in which.

Figures 1, 3, 4, 6:
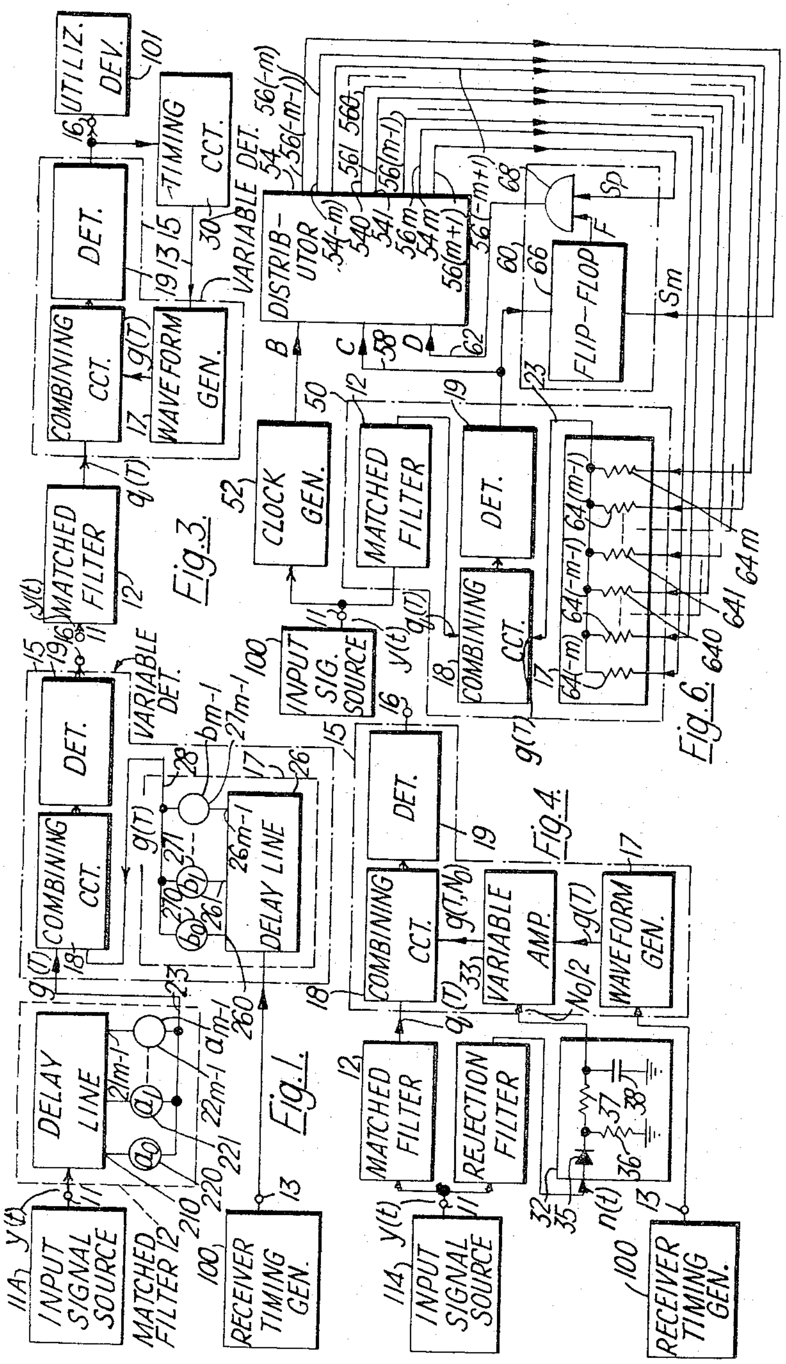
FIG. 1 is a circuit diagram, partly shown in block form of an embodiment of the invention.
FIG. 3 is a block diagram of a synchronizing device wherein use is made of a synchronizing signal detector of the invention.
FIG. 4 illustrates another embodiment of the invention which has advantages where variation occurs in the mean power of the noise including other information signals than the synchronizing signals.
FIG. 6 is a diagram of a synchronizing device in which use is made of a synchronizing signal detector of the invention and which is particularly suited for use in a digital communication system.

FIG. 1 illustrates a synchronizing signal detector according to this invention in which an input terminal 11 is provided for receiving a received signal $y(t)$ for example, from source 11A which has been amplified at an amplifier (not shown) in the receiver. A matched filter 12 is supplied from the input terminal 11 with the received signal $y(t)$ and is adapted to condition the received signal so that detection of the synchronizing signal therein with excellent signal-to-noise ratio is facilitated. A timing signal input terminal 13 is provided for receiving the input timing signal from receiver timing generator 100 which determines the reference time points for the a priori probability $p(T)$ of the synchronizing time point T. A variable detector 15 is supplied from the matched filter 12 with the correlation output $q(T)$ and from the timing signal input terminal 13 with the input timing signal and is adapted to detect the synchronizing time points T in accordance with a predetermined law. An output terminal 16 is provided and connected to a utilization device (not shown) for connecting the output of the variable detector 15 which output represents the synchronizing time point T. The variable detector 15 comprises a waveform generator 17 for producing an output waveform $g(T)$ predetermined in accordance with the input timing signal applied from the timing signal input terminal 13; a combiner 18, such as an adder, for combining the correlation output $q(T)$ of the matched filter 12 and the output waveform $g(T)$ of the waveform generator 17; and a detector 19 for detecting in accordance with the above-mentioned law the synchronizing time point T from the combined output of the combiner 18 to deliver the detected synchronizing time point T to the output terminal 16.

Figure 2:
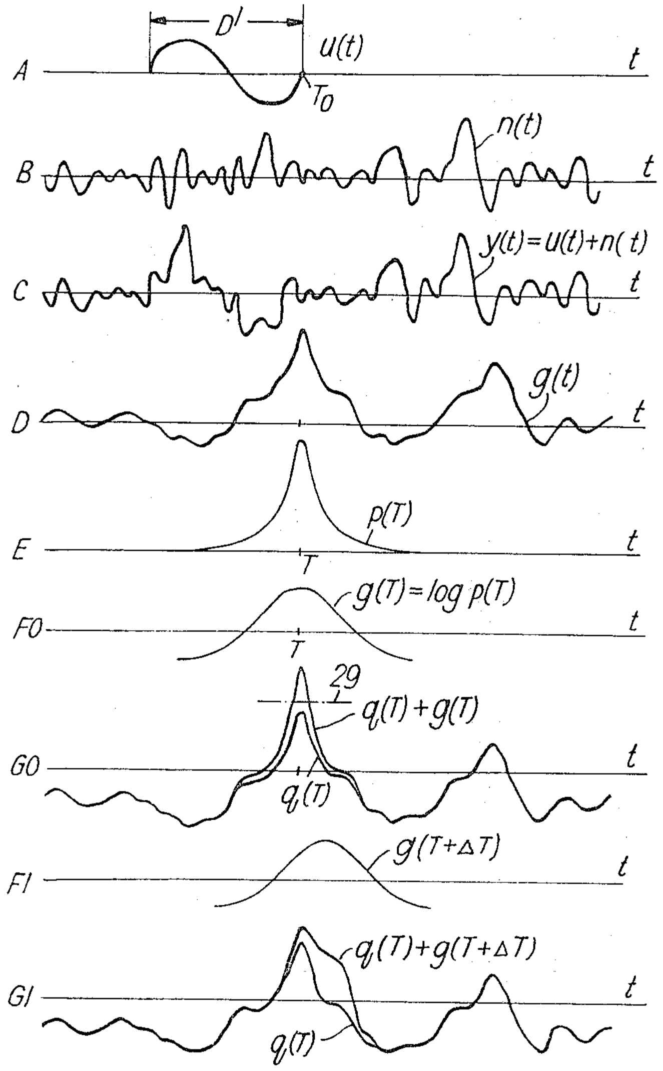
FIG. 2 illustrates waveforms which explain the operation of the synchronizing detectors of the invention for the case where the synchronizing and the information signals altogether form a continuous waveform.

The operation of the device of FIG. 1 will now be detailed in conjunction with the waveforms of FIG. 2. If the waveform of the synchronizing signal received at the input terminal 11 is $u(t)$ as shown in FIG. 2(A), then this is the ideal case in which the synchronizing signal reaches the input terminal 11 in the same form as it was transmitted. In practice, the synchronizing signal $u(t)$ reaches the input terminal 11 with noise signals superimposed thereon, and additionally is usually accompanied by other time divided information signals, such as channel signals. If the combined noise and information signals at the input terminal 11 is designated $n(t)$, and if the waveform of the signal $n(t)$ is as illustrated in FIG. 2(B), then the total received signal $y(t)$ reaching the input terminal 11 is:

$$y(t)=u(t)+n(t) \quad (1)$$

The waveform of the total received signal $y(t)$ is shown in FIG. 2(C). The a posteriori probability $P_y(T)$ that the synchronizing time point T obtained at the receiver from the received signal $y(t)$ (after reception of the received signal $y(t)$,) or the probability of the event that the synchronizing time point T obtained at the receiver is the true synchronizing time point $T_0$ illustrated in FIG. 2(A) is obtained from Bayes' theorem as follows:

$$p_y(T)=k.p(T) \exp q(T) \quad (2)$$

Bayes' theorem is explained in "Probability and Information Theory With Application to Radar," written by Woodward and published by Pergamon Press, London, England (1953), pages 81–99 and particularly in Equations, 2–4 of this reference. As in said Equation 2, $k$ is defined as a constant; $p(T)$ is the a priori probability for the synchronizing time point obtained at the receiver, or more particularly the probability distribution obtained when a first synchronizing time $T_1$ obtained at the receiver (such as a previous synchronizing time point), is assumed to be correct, that the next synchronizing time point may appear at a time point T; and $q(T)$ is a correlation coefficient between the received signal $y(t)$ and the synchronizing signal $u(t)$ which would reach the input terminal 11 in the ideal case, and where $q(T)$ is given by:

$$q(T)=(2/N_o).\int y(t).u(t-T)dt \quad (3)$$

In Equation 3 $N_o/2$ is the mean electric power of the noise $n(t)$, and is illustrated by the waveform shown in FIG. 2(D). The third factor $\exp q(T)$ in the right-hand side of the Equation 2 is a quantity proportional to the likelihood of occurrence. In time estimation in radar or like, the a priori probability of the distance at which the target is present is not known beforehand and consequently the second factor $p(T)$ of Equation 2 has no meaning by itself. Therefore, the only thing to do was to search for the time T at which the likelihood (or the third factor $\exp [q(T)]$) reaches a maximum. However, in detecting the synchronizing signal in the case where the a priori probability $p(T)$ of the synchronizing time point is known (as in the case shown in FIG. 2(E),) it is most preferable to determine as the synchronizing time point at the receiver that time point T at which the a posteriori probability $P_y(T)$ given by the Equation 2 reaches the maximum. Inasmuch as the Equation 2 can be rewritten into $$p_y(T)=k. \exp [q(T)+\log p(T)] \quad (4)$$

It follows that it is most preferable to detect the time point at which $q(T)+\log p(T)$ rises to the maximum and to designate this time point T, the synchronizing time point.

Thus, referring back to FIG. 1, the matched filter 12 transforms the received signal $y(t)$ (of FIG. 2(C)) to an output signal (and represented by the same symbol $q(T)$) which is related to the correlation coefficient $q(T)$ given by Equation 3. When the noise $n(t)$ is white noise having a stationary Gaussian distribution, it will be recognized (by referring to the Equation 3 hereinabove and to a paper entitled "An Introduction to Matched Filters" by G. L. Turin in "I.R.E. Transaction on Information Theory," vol. IT–6 (1960), pages 331–329 (No. 3, June Issue)), that the matched filter may be made to have an impulse response to $u(-t)$ where $u(t)$ is the synchronizing signal. Such a matched filter 12 comprises a delay line 21 supplied with the received signal $y(t)$ which is provided with a zeroth, a first, . . ., and an $(m-1)$th tap 210, 211, . . ., and 21$(m-1)$ for deriving transformed received signals consisting of the received signal itself and delayed received signals delayed successively by a predetermined time interval D, respectively. Additionally, a zeroth, a first, . . ., and an $(m-1)$th coefficient circuit 220, 221, . . ., and 22$(m-1)$ are respectively supplied with the transformed received signals from the taps 21, 211, . . ., and 21$(m-1)$, respectively. These circuits 220, 221, etc. are adapted to produce coefficient output signals or electrical quantities, respectively, which are respectively in a predetermined relationship with the electrical quantities of the transformed received signals. Connector 23 is provided for adding the coefficient outputs. More particularly, if the coefficient output of a coefficient circuit 22$i$ (connected to the $i$th tap 21$i$) is $a_i$ times the electrical quantity of the delayed received signal at that tap 21$i$, then an impulsive response $H(t)$ obtained at connector 23 will be $$H(t)=a_0.I(t)+a_1.I(t-D)+a_2.I(t-2D) + \dots +a_{m-1}.I[t-(m-1)D] \quad (5)$$

when an impulse $I(t)$ is applied to the input terminal 11. If the factors $a_0$, $a_1$, . . ., and $a_{m-1}$ are preselected such that the envelope of the response impulse $H(t)$ is equal to $u(D'-t)$, then it is possible to provide a matched filter 12 which derives from the received signal $y(t)$ the correlation output $q(T)$ given by Equation 3. It is to be noted that the time delay D' (whose minimum value is shown in FIG. 2(A)) should not be shorter than the total time delay $(m-1)D$ between the end taps 210 and 21 $(m-1)$ of the delay line 21. Furthermore, this is an inevitable delay for realizing the matched filter 12 because it is impossible, in practice, to provide a negative time $-t$ and consequently a response impulse $u(-t)$. The coefficient circuits 220, 221, . . ., and 22$(m-1)$, if the factors $a_0$, and $a_1$, . . ., and $a_m-1$ are all positive may include resistors whose resistances are inversely proportional to the factors. If, however, some factors are negative, then these coefficient circuits may include inverters composed of transistors or vacuum tubes in the known manner plus resistors whose resistances are inversely proportional to the absolute values of such factors. In either of these cases, the coefficient circuits produce as the correlation output $q(T)$ in the connector 23 an electric current given by Equation 3 for a voltage of the received signal $y(t)$. In place of the filter explained above, the matched filter 12 may be a known correlator for deriving the correlation coefficient between the received signal $y(t)$ and a waveform which is congruent with the synchronizing signal $u(t)$. Incidentally, if the noise which has been mingled into the received signal $y(t)$ is not of the white stationary Gaussian type, then the matched filter 12 must be preceded by a noise whitening filter. Such modification, however, will not be described further since the matched filter in itself is not the inventive feature of the invention.

Again, referring to FIGS. 1 and 2, the waveform generator 17 produces the output waveform $g(T)$ in response to the input timing signal supplied to the timing signal input terminal 13 from source 100 according to the log $p(T)$ of Equation 4 or by $$g(T)=\log p(T) \quad (6)$$

The output $g(T)$ is illustrated in FIG. 2(F0) when the a priori probability $p(T)$ of the synchronizing time point T is as shown in FIG. 2(E). The waveform generator 17 is similar to the matched filter 12. It includes a delay line 26 supplied with the input timing signal and provided with a zeroth, a first, . . ., and an $(m-1)$th tap 260, 261, . . ., and 26$(m-1)$ for deriving transformed timing signals consisting of the input timing signal by itself and timing signals which are delayed successively by the aforementioned interval D, respectively. A zeroth, a first, . . ., and an $(m-1)$th coefficient circuit 270, 271, . . ., and 27$(m-1)$ are provided and supplied with the transformed timing signals from the taps 260, 261, . . ., and 26$(m-1)$, respectively, and are adapted to produce coefficient outputs which are respectively in a predetermined relation with the electrical quantities of the transformed timing signals. A common connector 28 is provided for summing the coefficient outputs. If the coefficient output of a coefficient circuit 27$i$ connected to the $i$th tap 26$i$ of the delay circuit 26$i$ is $b_i$ times the electrical quantity of the delayed timing signal at that tap 26$i$, when the factors $b_0$, $b_1$, . . ., and $b_{m-1}$ are selected such that the impulse response of the waveform generator 17 is an approximation to the function $g(T)$ in Equation 6. The distribution of the a priori probability $p(T)$ of the synchronizing time point T may be considered steep sloped and its symmetric relation with respect to the time point T as illustrated in FIG. 2(E). The output waveform $g(T)$ (FIG. 2(F0), although less steep is also symmetric with respect to the time point T. Consequently, the waveform generator 17 may alternatively be a pulse shaper which shapes the input timing signal supplied thereto. The combined output derived from the combiner 18 (which may be a known adder), is $q(T)+g(T)$ or the argument of the exponential function in the Equation 4 and have a waveform such as that shown in FIG. 2(G0).

Referring further to FIGS. 1 and 2, the detection circuit 19 receives the combined output $q(T)+\log p(T)$ (where $\log p(T)=g(T)$) of the combiner 18 and theoretically detects the time point T at which the combined output reaches the maximum. The detector circuit 19 removes that portion of the combined output $q(T)+\log p(T)$ which is larger than the threshold value shown in FIG. 2(G0) by the dashed line 29. This may be achieved by a known limiting circuit. The detector 19 also includes a differentiating circuit for deriving the time at which the thus limited combined output reaches the maximum or at the time derivative of the limited combined output becomes zero. Alternatively, if the signal-to-noise ratio is sufficiently large and if the synchronizing signal $u(t)$ provides the sharp waveform of the function $q(T)$ defined by the Equation 3, then the synchronizing time point T may be approximated by merely detecting the time point or interval at which the combined output $q(T)+g(T)$ reaches a predetermined value.

The operation of the device of FIG. 1 will be further elaborated by referring again to FIG. 2. Delay of synchronism by ΔT will delay the output waveform of the waveform generator 17 also by ΔT as shown in FIG. 2(F1) to make the same $g(T+\Delta T)$. Therefore, the combined output $q(T)+g(T+\Delta T)$ of the combiner 18 will not have as large a value with a salient peak at the synchronizing time point T as the peak shown in FIG. 2(D). However, it nevertheless has a sufficient peak (as illustrated in FIG. 2(G1), at the synchronizing time point T) to allow detection thereof. Thus, the synchronizing signal detector of the invention detects the synchronizing time point T by relatively lowering (in correspondence to the output waveform $g(T)$ of the waveform generator 17, the detection level of the variable detector 15 for the correlation output $q(T)$ supplied from the matched filter 12 in the neighborhood of the synchronizing time point T as predicted from that a priori probability $p(T)$. Even though the noise may produce in the correlation output $q(T)$ of the matched filter 12 a peak at a point other than the synchronizing time point T, which is as high as the peak at the synchronizing time point T, time variation of the detection level according to the invention will minimize the probability of spurious detection of a false synchronizing time point and enchance detection of the synchronizing time point at a time which is as statistically correct as possible.

Referring to FIG. 3, there is illustrated therein an example of a synchronizing device equipped with a synchronizing signal detector of the invention. In addition to the components of the synchronizing signal detector shown in FIG. 1, FIG. 3 also includes a timing circuit 30 which produces upon reception of the detection output from the output terminal 16 a timing signal at each of the synchronizing time points T. Output terminal 16 is connected to utilization device 101. If the synchronizing signal $u(t)$ is a periodic signal as in most cases, the timing circuit 30 may be a single tuned filter such as a quartz filter, for selecting the synchronism frequency component. It may also be a higher-grade filter, such as a known phase-locked oscillator, which comprises a phase detector and a variable frequency oscillator. The timing signal obtained by such a timing circuit may be supplied by itself to the timing signal input terminal 13 as the input timing signal.

Referring to FIG. 4, an embodiment of a synchronizing signal detector is shown which is adapted to vary the detection level of the variable detector 15 in accordance with the variation, if any, in the noise level. This detector, in addition to the components of the synchronizing signal detector shown in FIG. 1 also includes: a synchronizing signal rejection filter 31 for rejecting the synchronizing signal component $u(t)$ from the received signal supplied from the input terminal 11; a noise power detector 32 for detecting the average noise power $N_0/2$ over a predetermined time interval, of the noise component $n(t)$ supplied from the filter 31, and a variable amplifier 33 which has an amplification factor which varies (larger and smaller) according as the detected average noise power $N_0/2$ becomes larger and smaller, respectively. The variable amplifier 33 is disposed in the variable detector 15 so as to amplify the output waveform $g(T)$ of the waveform generator 17 and to supply the amplified output waveform $g(T,N_0)$ to the combiner 18. The synchronizing signal rejection filter 31 may be a conventional band rejection filter which rejects the frequency component of the synchronizing signal $u(t)$ or alternatively may be a gate which receives the input timing signal from receiving timing generator 100 at timing signal input terminal 13 and closes during the time or the substantial time of the synchronizing signal. The noise detector 32 comprises, as illustrated in FIG. 4, a square-law detector including a diode 35 for square-law detection of the noise $n(t)$ (which is the output of the synchronizing signal rejection filter 31) and a low-pass filter including resistors 36 and 37 and a capacitor 38 for causing the lower frequency portion of the detector 35 to pass therethrough. Detector 32 produces an output power which is proportional to the average power $N_0/2$ of the noise $n(t)$.

As has been explained, the invention provides a synchronizing signal detector by which it is possible to impart to the detected synchronizing time point T the maximum a posteriori probability (defined by the Equation 4), when the a priori probability $p(T)$ of the synchronizing time point T is predictable. It is to be noted here that the synchronizing signal detector detects the time point at which the argument of the exponential function in the right-hand side of the Equation 4 reaches the maximum and that the argument is given by $$q(T)+g(T)=(2/N_0).\int y(t).u(t-T)dt+g(T) \quad (7)$$

from the Equations 3 and 6. Although in the explanation of the operation of the synchronizing signal detector of FIG. 1 with reference to FIG. 2, the output of the matched filter 12 (which relates to the correlation coefficient $q(T)$) was denoted by the same symbol as described just below the Equation 4, said output is proportionate to the integral of the second factor in the right-hand side of the Equation 3 while the correlation coefficient is a product of $2/N_0$ and the integral. Consequently, if the noise power $N_0/2$ is constant, it is possible with the synchronizing signal detector shown in FIGS. 1 and 3, to combine the outputs of the matched filter 12 and the waveform generator 17 such that the combined output may be proportional to the right-hand side of Equation 7. Although the noise power $N_0/2$ may be deemed constant at the input terminal located at the receiver, the level of the signal supplied to said terminal will vary, in case the transmission line is a wireless one, for reasons such as fading and the like. In such a case, it is the practice to control the receiver by an automatic voltage-control circuit or the like so that the output voltage of the receiver may be constant. Consequently, the noise power $N_0/2$ at the input terminal 11 of the synchronizing signal detector of FIG. 1 or 3 (which is generally supplied with the signal at a stage before the stage housing the automatic voltage-control circuit) varies inversely to the received signal level. As a result, the output of the matched filter 12 has to be amplified to be inversely proportional to the noise power $N_0/2$ in accordance with the right-hand side of the Equation 7. This permits the outputs of the matched filter 12 and the waveform generator 17 to be combined at the combiner 18 so as to satisfy the right-hand side of the Equation 7.

In the synchronizing signal detector shown in FIG. 4, the output waveform $g(T)$ of the waveform generator 17 is amplified in the variable amplifier 32 to be proportional to the noise power $N_0/2$ of the received signal $y(t)$ supplied to the input terminal 11 such that the output $q(T)$ of the matched filter 12 (or more particularly the output quantity which is proportional to the integral of an integrand $y(t).u(t-T)$ with respect to $t$) and the output wave $g(T)$ may be combined in the combiner 18 to satisfy the right-hand side of the Equation 7 even if the noise power $N_0/2$ varies. In this manner, the combiner 18 produces a combined output proportional to the second factor in the right-hand side of Equation 7 as follows:

$$q(T)+g(T)=(2/N_0).[\int y(t).u(t-T)dt+N_0/2).g(T)] \quad (8)$$

Equation 8 is derived by modifying the right-hand side of the Equation 7. Insasmuch as the variation of the noise power $N_0/2$ is generally less marked than the variation of the received signal $y(t)$ or the synchronizing signal $u(t)$, the synchronizing time point T may be detected by searching for that time point at which the second factor reaches the maximum instead of the time point at which the left-hand side of the Equation 8 reaches a maximum. The synchronizing signal detector of FIG. 4 searches for the time at which the second factor in the right-hand side of the Equation 8 reaches a maximum. However, the time at which the absolute value of the right-hand side of the Equation 8 reaches a maximum may alternatively (although not mandatory in general) be searched for by either amplifying the output of the matched filter 12 to be inversely proportionally to the noise power $N_0/2$ or by changing the limiting level of the detector 19 to be inversely proportionally to the noise power $N_0/2$.

Figure 5:
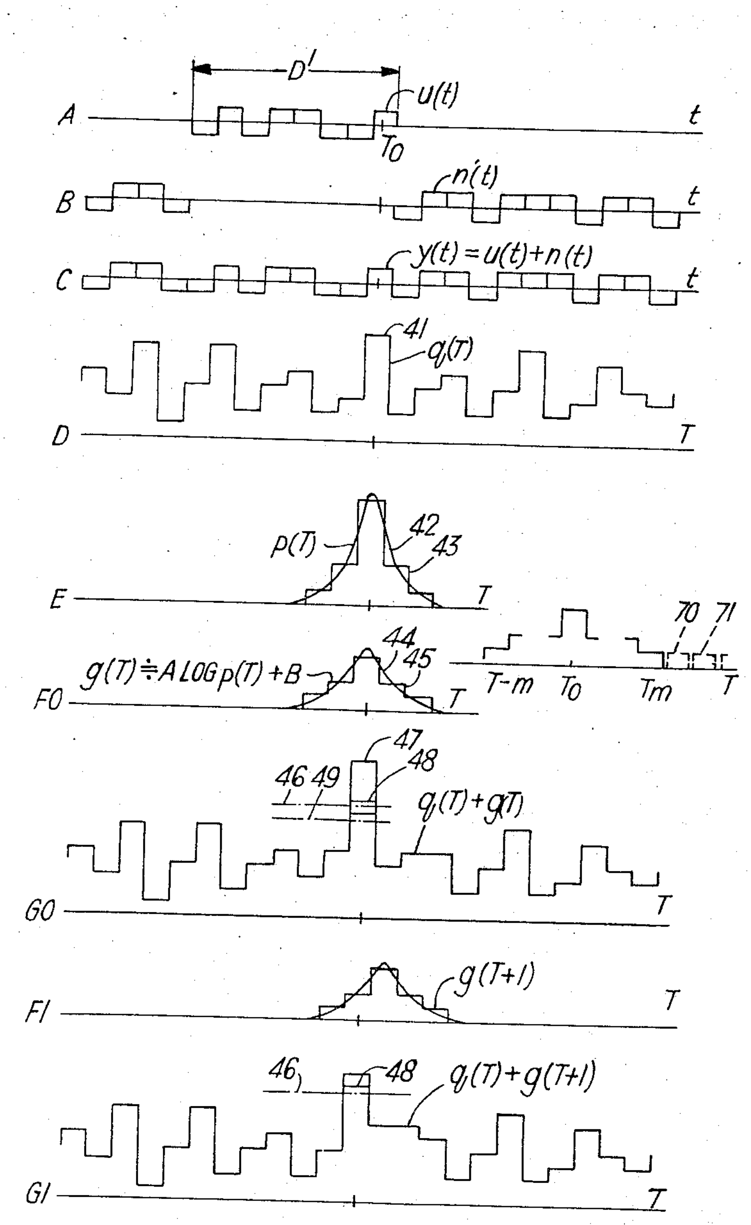
FIG. 5 illustrates waveforms which explain the operation of various synchronizing signal detectors of the invention for the case where the synchronizing and the information signals are digital signals.

Referring to FIG. 5, it will be seen that the synchronizing signal detector of the invention shown in FIG. 1 operates in the manner explained with reference to FIG. 2, even though the synchronizing signal are digital signals of discrete amplitudes which are sampled at sampling time points.

In FIG. 5, it is assumed that the digital signal is a binary code represented by the voltages +1 and −1 and that the synchronizing signal is an eight-bit code (−, +, −, +, +, −, −, +). With this assumption, the matched filter 12 has an impulse response given by $u(D'-t)$, and in which number of taps 210, 211, . . . of the delay line 21 of FIG. 1 is eight. The factors $a_0$, $a_1$, . . ., and $a_7$ of the coefficient circuits 220, 221, . . ., and 227 of FIG. 1 are in reversed order to the synchronizing signal $u(t)$ or, in the present case (+, −, −, +, +, −, +, −). The details of this construction will be found in an article by H. H. Barker in "Communication Theory," London Symposium (1952), published by Butt, Science Publications (1953). Furthermore, where the digital signals are to be handled, the matched filter 12 may alternatively comprise (in place of the delay line 21) an eight-stage shift register, such as a cascaded eight-stage multivibrator and the common connector 23 connected to the bistable stages constituting the shift register and connected so that among the +1 or the −1 output of each stage only the +1 outputs may be summed up when the digit codes of the synchronizing signal $u(t)$ are stored in the corresponding bistable stages. In any event, the matched filter 12, if supplied with the received signal $y(t)$ shown in FIG. 5(C) which is the sum of the synchronizing signal of FIG. 5(A) and the error due to the noise $n(t)$ of FIG. 5(B), will produce on connector 23 an output $q(T)$ having a +8 level as illustrated in FIG. 5(D) by the peak 41 when the synchronizing signal $u(t)$ is just registered in the matched filter 12. The filter 12 also produces another output $q(T)$ which ranges from 0 to the +8 level (also as shown in FIG. 5(D)) when the eight-bit codes among the received signal $y(t)$ (including either only a portion of or none of the synchronizing signal $u(t)$) are registered therein. Incidentally, eight-bit synchronizing signal $u(t)$ may be composed in $2^8=256$ ways. Thus, the synchronizing signal will be selected to make the correlation coefficient $q(T)$ as small as possible at time points other than the synchronizing time point T. The preferred synchronizing signals including the one referred to herein, may be found in the aforementioned Barker reference. The distribution of the a priori probability $p(T)$ of the synchronizing time point T, which is shown in FIG. 5(E) by curve 42, will be approximated by a histogram 43 illustrated therein. The logarithmic function $g(T)$ of the a priori probability $p(T)$ (or the result of quantization of the sampled amplitude of the waveform illustrated in FIG. 5(F0)) will be approximated by curve 45 and may be represented approximately by the equation:

$$g(T)=A.\log p(T)+B \tag{9}$$

where A is a coefficient corresponding to $2/N_0$ as shown in Equation 3, and where B is a bias level which may be selected in the manner to be explained hereinafter. In the case illustrated in FIG. 5(F0), the function $g(T)$ given by Equation 9 has levels numbered 0, 1, 2, and 4. The sum of the function $g(T)$ given by Equation 9 and derived from the waveform generator 17 by the input timing signal and the correlation output $q(T)$ exceeds the 8 level at the synchronizing time point T, as shown in FIG. 5(G0). Consequently, the synchronizing time point T can be detected with the maximum a posteriori probability by setting the limiting level of the detector 19 above the 8 level as shown in FIG. 5(G0) by dashed line 46.

Still referring to FIG. 5, the probability $p(T_0)$ that a subsequent synchronizing time point T is correct when the prior synchronizing time point is correct true, is almost unity and consequently log $p(T_0)$ is substantially zero. If log $p(T_0)$ is raised by a bias level B to be a waveform shown in FIG. 5(F0), the highest level 47 of the combined output shown in FIG. 5(G0) will be $8+B$. Inasmuch as the detector 19 with the shown limiting (slice) level 46 detects a voltage exceeding 8+1, the detector 19 can detect a synchronizing time point T even though the combined output $q(T)+g(T)$ supplied thereto is lower at the synchronizing time point T by $B-1$ levels (shown by line 48 in FIG. 5(G0)). In other words, selection of the bias level B at a value which results in the histogram 45 of FIG. 5(F0) will provide $B-1$ levels for detection. If there are $k$ errors caused by noise or the like in the eight-bit synchronizing signal $u(t)$ in the received signal $y(t)$, the level of the combined output $q(T)+g(T)$ at the synchronizing time point T will decrease to $8+B-k$ level. Consequently, the synchronism can be retained even if the synchronizing signal $u(t)$ may have errors of up to $k=B-1$ bits. If the synchronism has stepped out by one bit, the output waveform $g(T+1)$ of the waveform generator 17 will be as shown in FIG. 5(F1), and the combined output $q(T)+g(T+1)$ of the combiner 18 will be as shown in FIG. 5(G1). In this case, the detection area above the limiting (slice) level 46 shown in FIG. 5(G1) (or the number of levels above the short line 48 shown therein) is only one. As a result the synchronizing time point T cannot be detected even if an error of only one bit should occur in the synchronizing signal $u(t)$. Likewise, whether synchronizing time point T can or cannot be detected in case either or both the synchronism has stepped out by a given number of bits and/or the synchronizing signal $u(t)$ has an error of a given number of bits, depends on the output waveform $g(T)$ such as shown in FIG. 5(F0). As for the particular waveforms shown in FIG. 5, the true synchronizing time point T can be detected even with a two-bit shift of synchronism provided the synchronizing signal $u(t)$ contains no error.

Still referring to FIG. 5, a shift of synchronism by +3 bits or more will lower the level of the combined output $q(T)+g(T)$ at the synchronizing time point T below the 8 level so that the synchronizing time point T can no longer be detected with the waveforms shown in FIG. 5. However, in the case where the a priori probability $p(T)$ of the synchronizing time point T has the distribution shown in FIG. 5(E), the probability that synchronism will step out by +3 bits or more is very small and approximately zero. Nonetheless, it is sometimes necessary to be able to detect the synchronizing time point T even with a +3 bit shift. For example, at start-up, transients are present in the transmitter and the receiver. Thus, the synchronizing time points are not estimable and the shift of synchronism would exceed +3 bits. In order to overcome this difficulty, the limiting (slice) level of the detector 19 can be lowered as shown in FIG. 5(G0) by dashed line 49 so that the detector 19 will be able to produce the detection output when the combined output $q(T)+g(T)$ exceeds the 8 level. Alternatively, the value of the output waveform $g(T)$ of the waveform generator 17 may be changed from 0 to 1 where T is spaced by +3 bits from the synchronizing time point. Both methods, however, are not preferred because false synchronism would result if the received signal $y(t)$ happens to contain besides the true synchronizing signal $u(t)$, a code sequence which is of the same arrangement as the synchronizing signal $u(t)$. If in the received signal $y(t)$, the occurrence code + or − is statistically independent and identically distributed, then the probability that a code sequence of the same arrangement as the $m$-bit synchronizing signal $u(t)$ would occur in the noise $n(t)$ is $\frac{1}{2}^m$ and consequently the probability of falling into false synchronism would be $\frac{1}{2}^8=3.9\times10^{-3}$ if the synchronizing signal $u(t)$ is of eight-bit code length.

Referring to FIG. 6, a synchronizing device is illustrated which includes the synchronizing signal detector of the invention and means to overcome a shift of synchronism by several bits which may prevent the detection of a synchronizing time point T within a synchronizing signal detection interval, or within a time interval when the waveform $g(T)$ (derived from the a priori probability $p(T)$ of the synchronizing time point T of FIG. 5(E) and shown in FIG. 5(G0)) is not zero. The device of FIG. 6 provides for detection of the synchronizing time point T by extending the synchronizing signal detection interval by one bit until the synchronizing time is eventually determined. Synchronism may thus be stabilized or the system may be prevented from falling into a false synchronism by use of the system of FIG. 6. FIG. 6 may include the synchronizing device described in my copending patent application S.N. 304,857, entitled "Synchronizing Device for a Pulse Code Transmission System," filed on August 27, 1963. More particularly, the system of FIG. 6 has a known clock pulse generator 52 connected to the input terminal 11 so as to be supplied therefrom with the received signal $y(t)$ to produce clock pulses B. A distributor 54, such as a rotary switch or a ring counter, is provided which is supplied with the clock pulses B to step so as to produce step pulses successively at N step positions whose number is equal to the number of bits between the neighboring pair of synchronizing time points and which is arranged so that the step pulse may be taken out, if necessary, from the corresponding step position. Additionally, detection interval step position wirings 56(—$m$) through 56$m$ is attached to the distributor 54 so as to derive a step pulse from any one of the detection interval step positions 54(—$m$), 54(—$m$+1), . . ., 54(—1), 540, 541, . . ., 54($m$—1) and 54$m$. The steps range from a step position 54(—$m$) to the position 54($m$). At the 54(—$m$) position, a step pulse would appear (while in the synchronized state) at a bit time position $T_{-m}$, where the detection interval is $2m+1$ bit time intervals wide, as shown in FIG. 5(F0'). The time intervals begin at the bit time position $T_{-m}$ (disposed prior to the true synchronizing time point $T_0$ by $m$-bit time intervals) and end at another bit time position $T_m$ disposed after the true time point by $m$-bit time intervals. Thus, a step pulse would appear at the synchronizing time point if the synchronism is in advance by $m$ bits from step position 540 (on which a step pulse would appear at the true synchronizing time point $T_0$ while in the synchronized state), to a step position 54$m$ (on which a step pulse would appear while in the synchronized state at the bit time position $T_m$ or on which a step pulse would appear at the synchronizing time point if the synchronism lags by $m$ bits). First reset wiring 58 is provided for supplying a detection output C obtained at the synchronizing time point T from the synchronizing signal detector 50 to the distributor 54 so as to reset the distributor 54 in a known manner to the step position 540. The resetting may be adjusted to cause a step pulse to appear on the step position 541 at the time point of a selected one of the clock pulses B as may occur after the appearance of the detection output C. Step position outside wiring 56(—$m$—1) and 56($m$+1) are connected to the two end step positions 54(—$m$—1) and 54($m$+1) respectively to derive a step pulse, if any, appear on the outside step positions. A control circuit 60 is supplied with the step pulses which appear on either of the end step position outside wirings 56(—$m$—1) and 56($m$+1) along with the detection output C and is adapted to detect (if a step pulse does not appear on any one of the detection interval step positions 54(—$m$) through 54$m$ at the true synchronizing time point $T_0$) the fact that stepping of the distributor 54 is in such a state, and to produce a control pulse D for shifting the stepping of the distributor 54 by a predetermined number of bits (such as by one bit in the present example) in order to eventually restore synchronism. A second reset wiring 62 is provided for supplying the control pulse D, if any, to the distributor 54 at the step position 54$m$ or so that the control pulse D may cause the distributor 54 to produce a step pulse on that step position wiring 56$m$ among the detection interval step position wirings on which a step pulse would appear at the time point of the last clock pulse within the detection interval.

The waveform generator 17 shown in FIG. 6, may be the same as the waveform generator shown in FIG. 1. Such a generator may be used by applying thereto only that step pulse which first appears among those which appear successively on the detection interval step position 54(—$m$) through 54$m$. Alternatively, the waveform generator 17 may comprise (where the distributor 54 serves as the delay line taps 26 in the waveform generator 17 shown in FIG. 1) resistors 64(—$m$) through 64$m$ connected to the detection interval step position wirings 56(—$m$) through 56$m$, respectively whose resistances are inversely proportional to the values of $g(T)$ (with $T_{-m}$ through $T_m$ substituted for T), respectively. The connector 23 connects the other ends of the resistors 64(—$m$) through 64$m$.

At any rate, the synchronizing device shown in FIG. 6 maintains the synchronized state by use of the detection output C while the time point at which the a posteriori probability $p_y(T)$ of the synchronizing time point T reaches maximum falls within the synchronizing signal detection interval. In other words, the synchronizing device of FIG. 6 maximized the a posteriori probability $p_y(T)$ of the synchronizing time point T while the synchronism is retained or even when the synchronism steps out within the detection interval.

As shown in FIG. 6, the control circuit 60 comprises a flipflop circuit 66 which is turned off if supplied with a detection output C and which is turned on to produce a flipflop pulse F when supplied with an earlier-time step position outside wiring 56(—$m$—1); and an AND gate 68 for passing therethrough as a control pulse D a later step pulse $S_p$ if such a pulse $S_p$ appears on the later-time step position outside wiring 56($m$+1) while a flipflop pulse F is present. The control circuit 60, therefore, is primed in response to an earlier step pulse $S_m$ for the production of a control pulse D. It returns to the unprepared state by sensing detection output C. Detection output C will be produced during the succeeding stepping of the distributor 54 due to the fact that the shift, if any, of stepping of the distributor 54 is within the the synchronizing signal detection interval. If output C is not produced, then immediately after the appearance of a later step pulse $S_p$, a control pulse D if generated (which in turn resets the distributor 54 at the last step position 54$m$ of the detection interval step positions or, more particularly, which causes a step pulse to appear at the step position 54$m$ immediately after the later step pulse $S_p$ has just appeared). When the stepping of the distributor 54 proceeds, after reset by the control pulse D, to produce a step pulse on the last step position wiring 56$m$ of the detection interval step position wirings, the waveform generator 17 shown in FIG. 6 by a circuit diagram produces a waveform or pulse 70 illustrated in FIG. 5(F0') by a dotted rectangle to extend the detection interval by one-bit time interval towards the later side. When a detection pulse C appears while the pulse 70 is present, the detection pulse C resets the distributor 54 at the step position 540 of the synchronized state, with the result that a clock pulse succeeding that clock pulses B which produced the later step pulse $S_p$ causes the distributor 54 to step to the next step position 541 to restore the synchronism. At the same time, pulse C causes the flipflop circuit 66 of the control circuit 60 to be turned off so that a control pulse D may no longer be produced. When a detection output C has not been produced during the one-bit extension of the detection interval, then the control circuit 60 produces at the time point of the succeeding clock pulse, another control pulse D, which in turn causes the waveform generator 17 to produce a pulse waveform 71 illustrated in FIG. 5(F0') by another dotted rectangle and allows the detection interval to be further extended by one bit. In this manner, the phase of stepping of the distributor 54 will eventually reach the synchronized state within $N-(2m+1)$ bit intervals at the longest.

It will be clear from the above description that the pulse for turning on the flipflop circuit 66 of the control circuit 60 may be any step pulse (instead of the step pulse produced on the earlier-time step position outside wiring 56(—$m$—1)), appearing at any of the step positions beginning at a step position 54($m$+2) and disposed at a still later position (with respect to the detection interval step position 54(—$m$) through 54$m$) than the step position 54($m$+1) accompanying the later-time outside step position wiring 56($m$+1) and reaching (after having passed the successive ones), the step position 54(—$m$—1) accompanying the earlier outside step position wiring 56(—$m$—1).

From the foregoing description of the operation of the devices of FIGS. 1, 3, 4 and 6 in conjunction with the waveforms of FIGS. 2 and 5, it is clear that there has been disclosed a novel method for synchronizing a receiver with time points in synchronizing signals contained in input signals. Thus, the method in its broadest form and as indicated in FIG. 1, would be as follows: The matched filter 12 derives a correlation signal indicative of the correlation between the input signals and a signal similar to the synchronizing signal; the waveform generator responsive to timing signals in the receiver generates a waveform having a form which is related to the probability distribution curve for the position of a timing point in the synchronizing signal; the correlation signal and the shaped timing signal are combined and the position of a timing point is detected from the combined signal; the detection of a timing point in turn lowers the detection level for the correlation signals in the predicted vicinity of the next timing point in accordance with the timing signals, thereby facilitating detection of said next timing point. In the embodiment of FIG. 3, the timing points detected, in turn control the positioning of the timing signals which are applied to the waveform generator.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. A synchronizing signal detector for synchronizing a receiver with synchronizing signals contained in received input signals supplied to the receiver, comprising:

(a) a timing signal source for generating timing signals having a shape which is related to the a priori probability distribution curve for the position of a timing point in said synchronizing signals;

(b) a matched filter connected to receive the input signals for producing filtered output signals which vary in accordance with a predetermined characteristic of the input signals; and (c) detector means connected to receive and combine the timing signals and the filtered output signals for detecting a timing point in said combined signals and producing a detector output signal each time said combined signals exceed a preset value, whereby the detection level for a time point in said filtered output signals is varied in accordance with the a priori probability distribution curve for the position of said time point, thereby to increase the likelihood of detection of said timing point.

2. A synchronizing signal detector as set forth in claim 1 wherein the detector means includes a combiner for combining the timing signals and the filtered signals and a peak detector connected to said combiner for producing said detector output signals whenever the combined signals reach a peak in excess of a predetermined value.

3. A synchronizing signal detector as set forth in claim 2 wherein the detector further includes a waveform generator connected to the timing signal source for shaping the timing signals to have a form generally indicative of the a priori probability distribution curve for the position of said timing point.

4. A synchronizing signal detector as set forth in claim 2 wherein the timing signal source is a timing circuit connected to the output of said detector, said timing circuit generating timing signals that have a predetermined relation to said detector output signals.

5. A synchronizing signal detector as set forth in claim 1 wherein the filter is selected to provide filtered output signals which vary in accordance with the average power contained in the input signal.

6. A synchronizing signal detector as set forth in claim 3 wherein the waveform generator is adapted to produce an output waveform which is generally proportional to the logarithmic function of the a priori probability distribution curve for the position of said synchronizing time point.

7. A synchronizing signal detector as set forth in claim 3 wherein the matched filter and the waveform generator each include a delay line having a plurality of taps thereon.

8. A synchronizing device as set forth in claim 3 wherein said detector further includes a rejection filter connected in parallel with said matched filter to receive said input signals, said rejection filter rejecting the synchronizing signals from the input signals; a noise power detector connected to the output of said rejection filter for detecting the average noise power in the input signals; and a variable amplifier connected to receive both the output from said noise power detector and the output of the waveform generator, for variably amplifying the output of said waveform generator in accordance with the detected average noise power, the output of said variable amplifier being connected to said combiner.

9. A synchronizing device as set forth in claim 1 wherein the frequency of the timing signal source corresponds to the freqeuncy of the synchronizing signals.

10. A synchronizing signal detector for synchronizing a receiver with synchronizing signals of a known frequency contained in received input signals applied to the receiver comprising:

(a) a timing signal source for generating timing signals which have a frequency equal to said known frequency and have a form which is related to the a priori probability distribution curve for the position of a timing point in the synchronizing signals;

(b) a matched filter connected to receive said input signals and producing filtered output signals which vary in accordance with a predetermined characteristic of said input signals; and (c) detector means connected to receive and combine said timing signals and said filtered signals for detecting a synchronizing time point in said filtered signals and producing a detection output signal each time a time point is detected, said variable detector means varying the detection level for said filtered output signals in accordance with said form of said timing signals.

11. A frame synchronizing device for digital code transmission comprising:

(a) a digital input source containing synchronizing signals and having a finite length during each frame period;

(b) a matched filter connected to receive said digital input signals for producing filtered output signals which vary in accordance with a predetermined characteristic of said digital input signals;

(c) a timing signal source for producing timing signals having a shape related to the a priori probability distribution curve for the position of a time point in said synchronizing signals; and detector means connected (d) detector means connected to receive and combine signals and the filtered signals for detecting a synchronizing time point in said combined signals and producing a detector output signal whenever the combined signals exceed a preset value.

12. A frame synchronizing device as set forth in claim 11 wherein the detector means includes a combiner for combining the timing signals and the filtered signals and a peak detector connected to said combiner for producing said detector output signals each time a characteristic of the combined signals exceeds a predetermined value.

13. A frame synchronizing device as set forth in claim 12 wherein the timing signal source includes: a clock pulse generator for producing clock pulses having a repetition period equal to the clock period of the input digital signals; a distributor connected to said clock pulse generator and having a plurality of step positions equal in number to the number of clock periods contained in one frame period, said distributor being adapted to step from one step position to the next in response to the clock pulse supplied thereto, said timing signal source further including means for supplying step pulses produced by at least one predetermined step position of said distributor to said detector as the timing signal.

14. A synchronizing device as set forth in claim 13 wherein the detector includes first means for re-setting said distributor with said detector output signals into a synchronized stepping state; logic circuit means responsive to both said detector output signals and a step pulse produced at a predetermined one of said step positions of said distributor for producing a control pulse; and second means for re-setting said distributor with said control pulse into a predetermined stepping state other than said synchronized stepping state.

15. In a method for synchronizing a receiver with known synchronizing signals contained in transmitted signals applied to the receiver, the steps which comprise in:

(a) deriving a correlation signal indicative of the correlation between the received input signal and a waveform similar to the known synchronizing signal;

(b) generating a timing signal in the receiver which has a waveform that is related to the known probability distribution curve for the position of a timing point in said synchronizing signal;

(c) combining said correlation signal and said timing signal; and (d) detecting when a predetermined relation exists between the thus combined signals and obtaining a timing point from the combined signal each time said predetermined relation is detected, whereby the detection level for a time point in said correlation signals is varied in accordance with the a priori probability distribution curve for the position of said time point.

16. In the method as set forth in claim 15 the additional step which comprises in generating a timing signal each time a synchronizing time point is detected.

17. A method for synchronizing a receiver with synchronizing signals contained in transmitted signals that are applied to the receiver, comprising the steps of:

(a) deriving a correlation signal which is indicative of the correlation between the input signals and a waveform that is similar to the synchronizing signal;

(b) generating a timing signal in the receiver which has a form generally related to the a priori probability distribution curve for the position of a time point in the synchronizing signal contained in the input;

(c) combining said correlation signals and said timing signals and detecting a timing point from a characteristic of the thus combined signals; and (d) varying the detection level for the correlation signals in the vicinity of the predicted position of the next timing point, in accordance with the form of timing signals each time a timing point is detected.

References Cited

UNITED STATES PATENTS 3,309,463 3/1967 Roedl .............. 178—69.5

JOHN W. CALDWELL, *Acting Primary Examiner.*

R. L. RICHARDSON, *Assistant Examiner.*

UNITED STATES PATENT OFFICE
CERTIFICATE OF CORRECTION

Patent No. 3,341,658 September 12, 1967

Hisashi Kaneko

It is hereby certified that error appears in the above numbered patent requiring correction and that the said Letters Patent should read as corrected below.

Column 14, line 53, after "combine" insert -- the timing --.

Signed and sealed this 1st day of October 1968.

(SEAL)
Attest:

Edward M. Fletcher, Jr.
Attesting Officer

EDWARD J. BRENNER
Commissioner of Patents